United States Patent
Yu

(10) Patent No.: US 9,497,363 B2
(45) Date of Patent: Nov. 15, 2016

(54) PHOTOGRAPHIC APPARATUS AND MANUFACTURING METHOD THEREOF

(71) Applicant: TAIWAN SEMICONDUCTOR MANUFACTURING CO., LTD., Hsinchu (TW)

(72) Inventor: Ching-Shiang Yu, Taichung (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 129 days.

(21) Appl. No.: 14/151,718

(22) Filed: Jan. 9, 2014

(65) Prior Publication Data
US 2015/0195465 A1    Jul. 9, 2015

(51) Int. Cl.
| | |
|---|---|
| *H04N 5/225* | (2006.01) |
| *G02B 26/00* | (2006.01) |
| *G03B 7/00* | (2014.01) |
| *G03B 11/00* | (2006.01) |
| *G02F 1/13* | (2006.01) |

(52) U.S. Cl.
CPC .......... *H04N 5/2254* (2013.01); *G02B 26/005* (2013.01); *G03B 7/00* (2013.01); *G03B 11/00* (2013.01); *G02F 1/1313* (2013.01); *Y10T 29/49117* (2015.01)

(58) Field of Classification Search
CPC .......... Y10T 29/49117; G02B 26/005; Y02F 1/1313; G03B 7/00; G03B 11/00
See application file for complete search history.

(56) References Cited

U.S. PATENT DOCUMENTS

| | | | |
|---|---|---|---|
| 2002/0012064 A1* | 1/2002 | Yamaguchi .......... | H04N 5/2254 348/362 |
| 2008/0074532 A1* | 3/2008 | Takaoka .............. | G02F 1/13306 348/362 |
| 2010/0066858 A1* | 3/2010 | Asoma .................. | H04N 5/232 348/229.1 |
| 2011/0025906 A1* | 2/2011 | Shurboff ................ | G03B 9/08 348/367 |
| 2012/0176530 A1* | 7/2012 | Zhuang ................ | G02B 26/004 348/345 |
| 2014/0240586 A1* | 8/2014 | Lee ........................ | H04N 5/238 348/362 |

* cited by examiner

*Primary Examiner* — Tuan Ho
(74) *Attorney, Agent, or Firm* — McDermott Will & Emery LLP

(57) ABSTRACT

A photographic apparatus includes a photoelectric conversion element, an electrochromic element, and an image processor. The electrochromic element is disposed on a main path by which light travels to the photoelectric conversion element. The image processor is electrically connected to the electrochromic element for adjusting a transmittance of the electrochromic element.

20 Claims, 5 Drawing Sheets

```
disposing an electrochromic element on a main path by
which light travels to a photoelectric conversion element
                        S910
```

```
electrically connecting an image processor to the
              electrochromic element
                        S920
```

PHOTOGRAPHIC APPARATUS AND MANUFACTURING METHOD THEREOF

BACKGROUND

A neutral density (ND) filter may be mounted on a photographic lens to decrease the amount of light incident to the lens. The ND filter enables a longer exposure time to be used in bright lighting conditions. In addition, the ND filter may enable larger apertures, which may produce a sharper picture or reduce depth of field. For a digital camera, the photographer may choose the type of the ND filter to mount on the digital camera according to the images to be captured by the digital camera. With a suitable ND filter, the images may be clearer or sharper.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
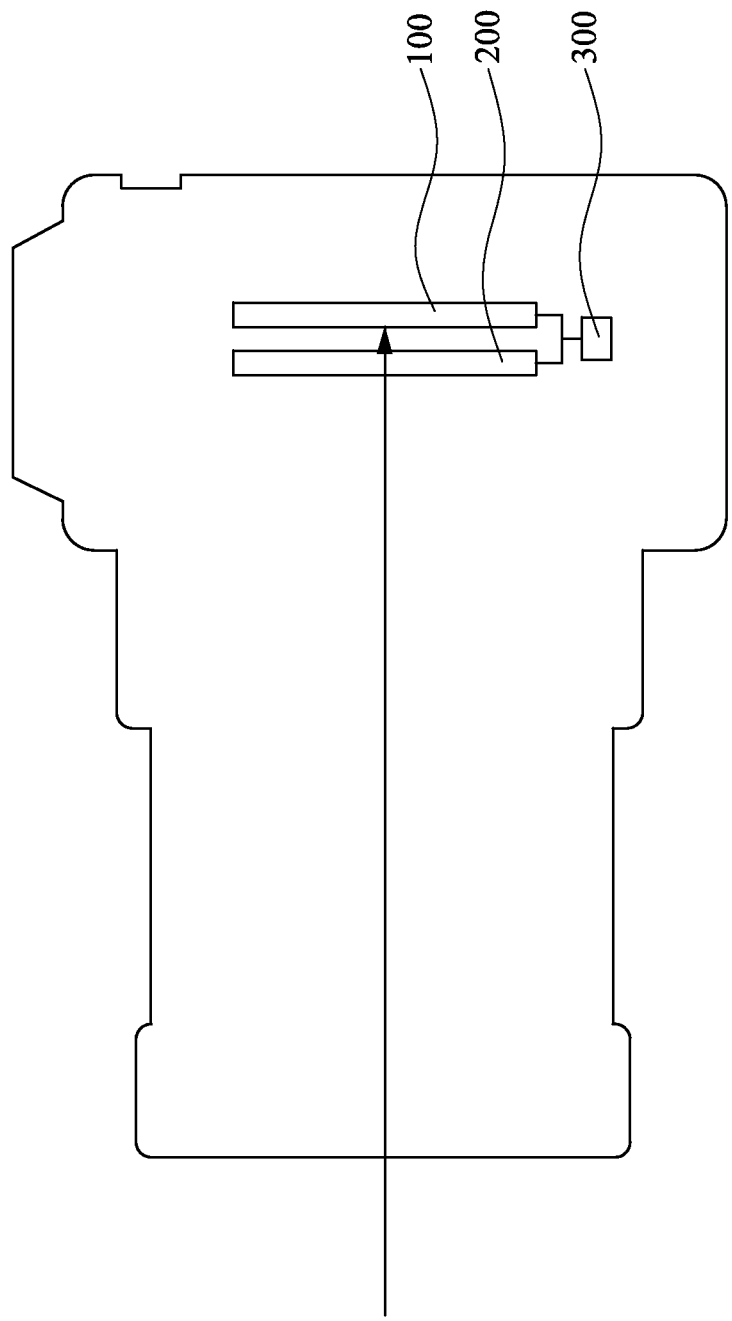
FIG. 1 is a side view of a photographic apparatus according to various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and apparatus are schematically depicted in order to simplify the drawings.

As used herein, the terms "comprising," "including," "having," "containing," "involving," and the like are to be understood to be open-ended, i.e., to mean including but not limited to.

FIG. 1 is a side view of a photographic apparatus according to various embodiments of the present disclosure. As shown in FIG. 1, the photographic apparatus includes a photoelectric conversion element 100, an electrochromic element 200, and an image processor 300. The electrochromic element 200 is disposed on a main path by which light travels to the photoelectric conversion element 100. The image processor 300 is electrically connected to the electrochromic element 200 for adjusting a transmittance of the electrochromic element 200. In this manner, the amount of light incident on the photoelectric conversion element 100 depends on the transmittance of the electrochromic element 200.

In some embodiments, the image processor 300 is further electrically connected to the photoelectric conversion element 100 for adjusting the transmittance of the electrochromic element 200 according to an output of the photoelectric conversion element 100. In greater detail, electrons are emitted from the photoelectric conversion element 100 when the photoelectric conversion element 100 absorbs energy from light. In other words, the output of the photoelectric conversion element 100 depends on the amount of light incident thereon. Through the image processor 300, the electrochromic element 200 turns opaque if the output of the photoelectric conversion element 100 is raised, such that the amount of light incident on the photoelectric conversion element 100 is reduced. As a result, saturation of the photoelectric conversion element 100 is avoided, thereby reducing or preventing overexposure.

In some embodiments, the photoelectric conversion element 100 is a charge-coupled device (CCD) or a complementary metal-oxide-semiconductor (CMOS) image sensor. However, the claimed scope of the disclosure should not be limited in this respect.

Figure 2:
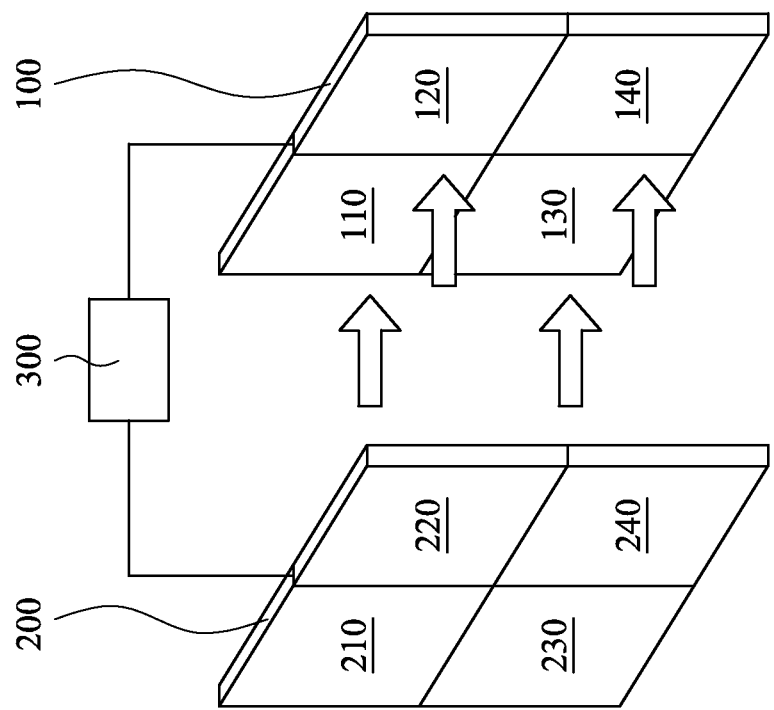
FIG. 2 is a schematic diagram of a photoelectric conversion element, an electrochromic element, and an image processor of FIG. 1.

Reference is made to FIG. 2 which is a schematic diagram of the photoelectric conversion element 100, the electrochromic element 200, and the image processor 300 of FIG. 1. In some embodiments, the electrochromic element 200 includes at least two individually controllable segments. Taking FIG. 2 as an example, the electrochromic element 200 includes four individually controllable segments 210, 220, 230, and 240. However, the claimed scope of the disclosure should not be limited in this respect. The image processor 300 is electrically connected to the individually controllable segments 210, 220, 230, and 240 for individually adjusting transmittances of the individually controllable segments 210, 220, 230, and 240.

In greater detail, the photoelectric conversion element 100 includes an array of pixel sensors 110, 120, 130, and 140. At least one of the individually controllable segments 210, 220, 230, and 240 is configured for adjusting the amount of light incident on at least one of the pixel sensors 110, 120, 130, and 140. In other words, at least one of the individually controllable segments 210, 220, 230, and 240 corresponds to at least one of the pixel sensors 110, 120, 130, and 140.

Taking FIG. 2 as an example, the individually controllable segments 210, 220, 230, and 240 respectively correspond to the pixel sensors 110, 120, 130, and 140. That is, the individually controllable segment 210 corresponds to the pixel sensor 110, the individually controllable segment 220 corresponds to the pixel sensor 120, the individually controllable segment 230 corresponds to the pixel sensor 130, and the individually controllable segment 240 corresponds to the pixel sensor 140.

When processing a high contrast image, the pixel sensors 110, 120, 130, and 140 may receive different amounts of light, which may cause overexposure in some pixel sensors and underexposure in other pixel sensors. Therefore, some details in the overexposed area and the underexposed area of the image may be missing or unclear. However, since the transmittances of the individually controllable segments 210, 220, 230, and 240 of the electrochromic element 200 are adjusted individually, the formation of overexposed areas and underexposed areas is prevented, and more image details are shown.

In some embodiments, light travels to the pixel sensors 110, 120, 130, and 140 of the photoelectric conversion element 100 respectively through the individually controllable segments 210, 220, 230, and 240 of the electrochromic element 200. A portion 910 of light is incident on the pixel sensor 110, a portion 920 of light is incident on the pixel sensor 120, a portion 930 of light is incident on the pixel sensor 130, and a portion 940 of light is incident on the pixel sensor 140. If levels are assigned to the light incident on the pixel sensors 110, 120, 130, and 140 representing different intensities thereof, in which a first intensity level indicates the highest intensity of light and a fourth intensity level indicates the lowest intensity of light, the portion 910 has the first intensity level, the portion 930 has the second intensity level, the portion 920 has the third intensity level, and the portion 940 has the fourth intensity level. Therefore, the pixel sensor 110 generates the highest output, the pixel sensor 130 generates the second highest output, the pixel sensor 120 generates the third highest output, and the pixel sensor 140 generates the lowest output.

The image processor 300 then receives the outputs of the pixel sensors 110, 120, 130, and 140, and performs feedback control with respect to the electrochromic element 200 to adjust the transmittances of the individually controllable segments 210, 220, 230, and 240. For example, if the outputs of the pixel sensors 110, 120, and 130 of the photoelectric conversion element 100 are in saturation states, the transmittance of the individually controllable segments 210, 220, and 230 are respectively reduced, while the transmittance of the individually controllable segment 240 remains at 100%. Therefore, the amounts of the light of the portions 910, 920, and 930 are filtered when the light passes through the individually controllable segments 210, 220, and 230 so that the formation of an overexposed area is prevented.

Figure 3:
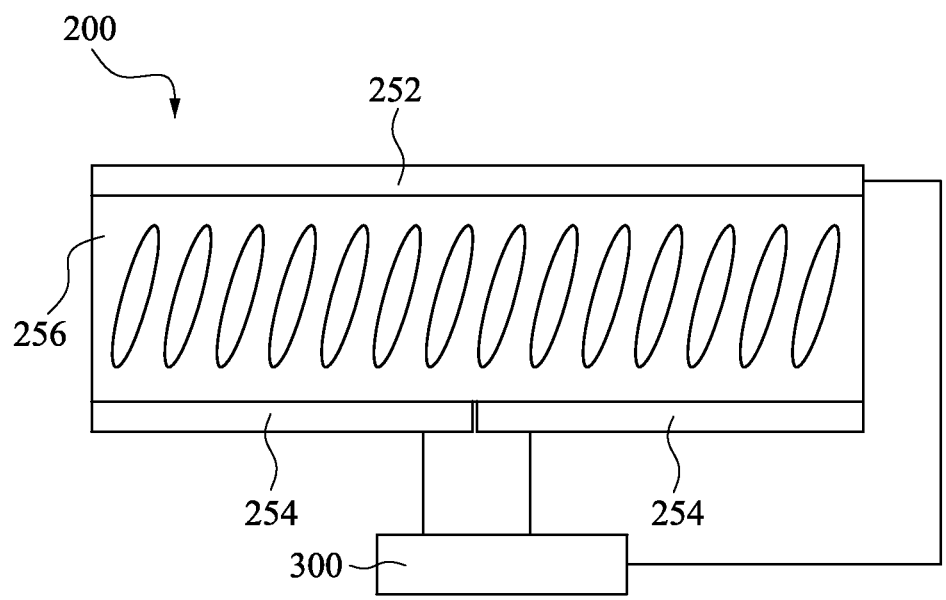
FIG. 3 is a cross-sectional view of the electrochromic element and the image processor of FIG. 2 according to various embodiments.

Reference is made to FIG. 3 which is a cross-sectional view of the electrochromic element 200 and the image processor 300 of FIG. 2 according to various embodiments. In some embodiments, the electrochromic element 200 is a liquid crystal panel. In greater detail, the electrochromic element 200 in FIG. 3 includes at least one first electrode 252, at least one second electrode 254, and a liquid crystal layer 256 disposed between the first electrode 252 and the second electrode 254. The first electrode 252 and the second electrode 254 are electrically coupled to the image processor 300, respectively. In accordance with aspects of the disclosure, the orientations of liquid crystal materials of the liquid crystal layer 256 changes depending on the electric potential between the first electrode 252 and the second electrode 254, such that the transmittance of the electrochromic element 200 is changed. This change in transmittance affects how much light is incident on the photoelectric conversion element 100. In some embodiments, when there is no electric potential across the liquid crystal layer 256, the transmittance of the liquid crystal layer 256 is at a highest value (e.g., most transmissive, least opaque). When different voltages are respectively applied to the first electrode 252 and the second electrode 254, the electric potential across the liquid crystal layer 256 is increased. The increased electric potential causes the liquid crystal materials of the liquid crystal layer 256 to rotate so that the liquid crystal layer 256 changes its transmittance, e.g., becomes more opaque. In this manner, the image processor 300 adjusts the transmittance of the electrochromic element 200 by applying different voltages respectively to the first electrode 252 and the second electrode 254 to change the electric potential across the liquid crystal layer 256.

In some embodiments, the photoelectric conversion element 200 in FIG. 3 includes a plurality of the second electrodes 254 so that the photoelectric conversion element 200 is divided into a plurality of the individually controllable segments as mentioned above. In other words, at least one of the second electrodes 254 corresponds to one of the individually controllable segments. Hence, the image processor 300 individually applies voltages to the second electrodes 254 to individually change the orientations of the liquid crystal materials of the individually controllable segments, and the transmittances of the individually controllable segments are individually adjusted.

Figure 4:
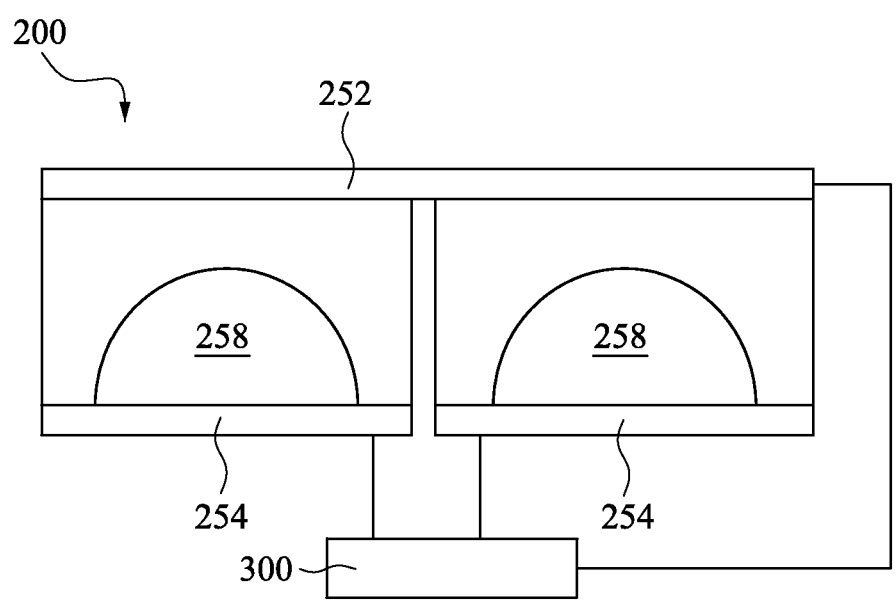
FIG. 4 is a cross-sectional view of the electrochromic element and the image processor of FIG. 2 according to various embodiments.

Reference is made to FIG. 4 which is a cross-sectional view of the electrochromic element 200 and the image processor 300 of FIG. 2 according to various embodiments. In some embodiments, the electrochromic element 200 is an electrowetting panel. In greater detail, the electrochromic element 200 in FIG. 4 includes at least one first electrode 252, at least one second electrode 254, and a plurality of electrowetting materials 258 disposed between the first electrode 252 and the second electrode 254. In some embodiments, the electrowetting materials 258 are oils. However, the claimed scope of the disclosure should not be limited in this respect. The first electrode 252 and the second electrode 254 are electrically coupled to the image processor 300, respectively. In accordance with aspects of the disclosure, the positions of the electrowetting materials 258 change depending on the electric potential between the first electrode 252 and the second electrode 254, and the transmittance of the electrochromic element 200 is therefore altered. This change in transmittance affects how much light is incident on the photoelectric conversion element 100. In some embodiments, when there is no electric potential across the electrowetting materials 258, the electrowetting materials 258 are aggregated between the first electrode 252 and the second electrode 254 so that the transmittance of the electrowetting materials 258 is at a highest value (e.g., most transmissive, least opaque). When different voltages are respectively applied to the first electrode 252 and the second electrode 254, the electric potential across the electrowetting materials 258 is increased. The increased electric potential causes the electrowetting materials 258 to spread out so that the electrowetting panel changes its transmittance, e.g., become more opaque. In this manner, the image processor 300 adjusts the transmittance of the electrochromic element 200 by applying different voltages respectively to the first electrode 252 and the second electrode 254 to change the electric potential across the electrowetting materials 258.

In some embodiments, the photoelectric conversion element 200 in FIG. 4 includes a plurality of the second electrodes 254 so that the photoelectric conversion element 200 is divided into a plurality of the individually controllable segments as mentioned above. In other words, at least one of the second electrodes 254 corresponds to one of the individually controllable segments. Hence, the image processor 300 individually applies voltages to the second electrodes 254 to individually change the position of the electrowetting materials 258 of the individually controllable segments, and the transmittances of the individually controllable segments are individually adjusted.

Figure 5:
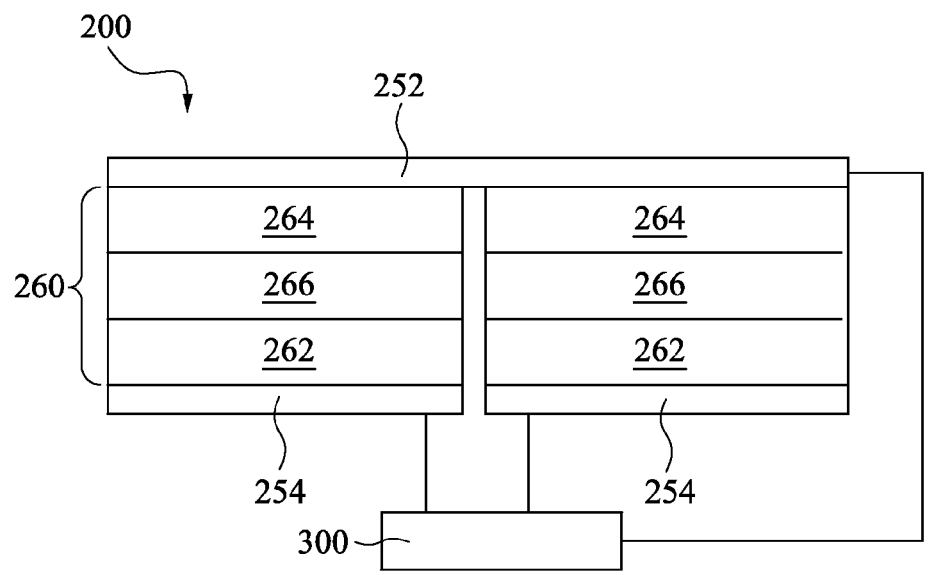
FIG. 5 is a cross-sectional view of the electrochromic element and the image processor of FIG. 2 according to various embodiments.

Reference is made to FIG. 5 which is a cross-sectional view of the electrochromic element 200 and the image processor 300 of FIG. 2 according to various embodiments. In some embodiments, the electrochromic element 200 is an electrochromic panel. In greater detail, the electrochromic element 200 in FIG. 5 includes at least one first electrode 252, at least one second electrode 254, and an electrochromic structure 260 disposed between the first electrode 252 and the second electrode 254. In some embodiments, the electrochromic structure 260 includes an electrochromic layer 262, an ion storage layer 264, and an ion conductor layer 266. The ion conductor layer 266 is disposed between the electrochromic layer 262 and the ion storage layer 264. However, the claimed scope of the disclosure should not be limited in this respect. The first electrode 252 and the second electrode 254 are electrically coupled to the image processor 300, respectively. In accordance with aspects of the disclosure, the motion of complex ionic compounds of the electrochromic layer 262 changes depending on the electric potential between the first electrode 252 and the second electrode 254, and the transmittance of the electrochromic element 200 is changed. This change in transmittance affects how much light is incident on the photoelectric conversion element 100. In some embodiments, when there is no electric potential across the electrochromic structure 260, the transmittance of the electrochromic structure 260 is at a highest value (e.g., most transmissive, least opaque). When different voltages are respectively applied to the first electrode 252 and the second electrode 254, the electric potential across the electrochromic structure 260 is increased. The increased electric potential causes the complex ionic compounds of the ion conductor layer 266 to move among the electrochromic layer 262, the ion storage layer 264, and the ion conductor layer 266 so that the electrochromic structure 260 changes its transmittance, e.g., become more opaque. In this manner, the image processor 300 adjusts the transmittance of the electrochromic element 200 by applying different voltages respectively to the first electrode 252 and the second electrode 254 to change the electric potential across the electrochromic structure 260.

In some embodiments, the photoelectric conversion element 200 in FIG. 5 includes a plurality of the second electrodes 254 and a plurality of the electrochromic structure 260 so that the photoelectric conversion element 200 is divided into a plurality of the individually controllable segments as mentioned above. In other words, at least one of the second electrodes 254 and at least one of the electrochromic structures 260 correspond to one of the individually controllable segments. Hence, the image processor 300 individually applies voltages to the second electrodes 254 to individually change the motion of the complex ionic compounds of the individually controllable segments, and the transmittances of the individually controllable segments are individually adjusted.

Reference is made to FIG. 1. In some embodiments, the image processor 300 is a control integral circuit, and the image processor 300 is programmed to adjust the transmittance of the electrochromic element 200 to affect the amount of the light incident on the photoelectric conversion element 100. In addition, the image processor 300 is programmed for adjusting the transmittance of the electrochromic element 200 according to the output of the photoelectric conversion element 100. Furthermore, the image processor 300 is programmed to individually adjust transmittances of the individually controllable segments if the electrochromic element 200 includes a plurality of the individually controllable segments.

Figure 6:
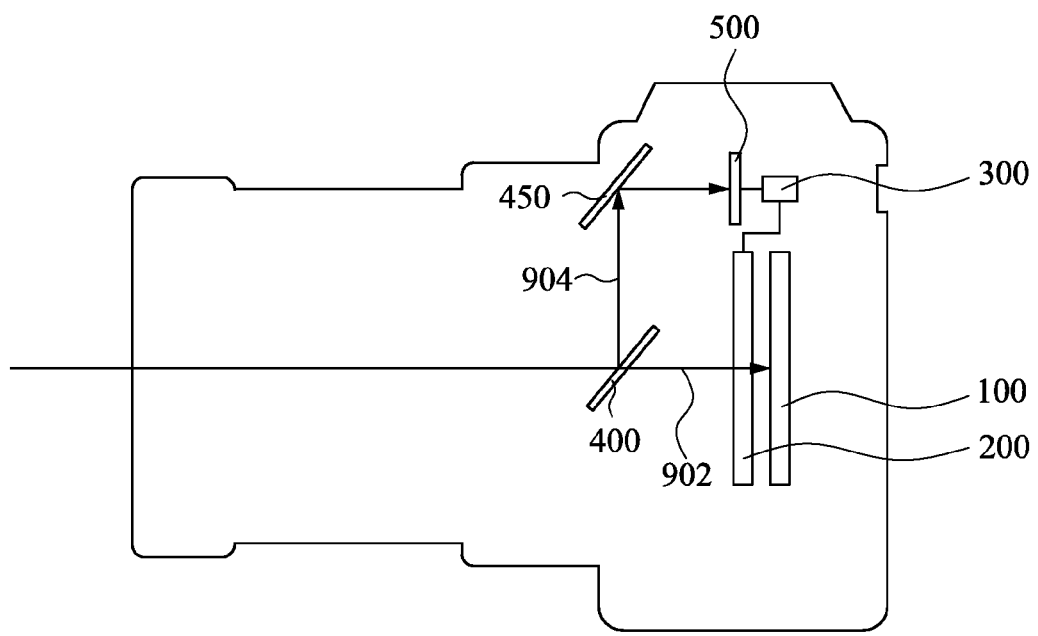
FIG. 6 is a side view of the photographic apparatus according to various embodiments of the present disclosure.

Reference is made to FIG. 6 which is a side view of a photographic apparatus according to various embodiments of the present disclosure. The difference between the photographic apparatus of FIG. 6 and FIG. 1 relates to additional elements in the configuration of the photographic apparatus of FIG. 6. In some embodiments, the photographic apparatus further includes a beam splitter 400 and an image sensor 500. The beam splitter 400, which may be a prism or a dichroic mirror, is disposed on an initial path by which the light travels to the electrochromic element 200 for splitting the light into at least two portions 902 and 904, and the portion 902 travels to the electrochromic element 200. The image sensor 500 is configured for sensing the portion 904 of the light. In some embodiments, the image processor 300 is further electrically connected to the image sensor 500 rather than being electrically connected to the photoelectric conversion element 100. The image processor 300 is configured for adjusting the transmittance of the electrochromic element 200 according to an output of the image sensor 500.

In greater detail, the light incident on the beam splitter 400 is split into the portions 902 and 904. The portion 904 of the light propagates to the image sensor 500. For example, after being reflected by the beam splitter 400, the portion 904 of the light is reflected by a reflector 450 and then is incident on the image sensor 500. On the other hand, the portion 902 of the light is incident on the electrochromic element 200 and the photoelectric conversion element 100 in sequence. Electrons are emitted from the image sensor 500 when the image sensor 500 absorbs energy from the portion 904 of the light. In other words, the output of the image sensor 500 depends on the amount of the portion 904 of the light incident thereon. Through the image processor 300, the electrochromic element 200 turns opaque if the output of the image sensor 500 is raised. Hence, the amount of the portion 902 of the light incident on the photoelectric conversion element 100 is reduced. As a result, saturation of the photoelectric conversion element 100 is avoided, thereby reducing or preventing overexposure. In some embodiments, the image sensor 500 is a charge-coupled device (CCD) or a complementary metal-oxide-semiconductor (CMOS) image sensor. Additionally or alternatively, the image sensor 500 includes an array of a plurality of pixel sensors. However, the claimed scope of the disclosure should not be limited in this respect. In some embodiments, the image processor 300 is a control integral circuit, such that the image processor 300 is programmed to adjust the transmittance of the electrochromic element according to the output of the image sensor 500. Other relevant structural details of FIG. 6 are all the same as FIG. 1, and, therefore, a description in this regard will not be repeated hereinafter.

Figures 7, 8:
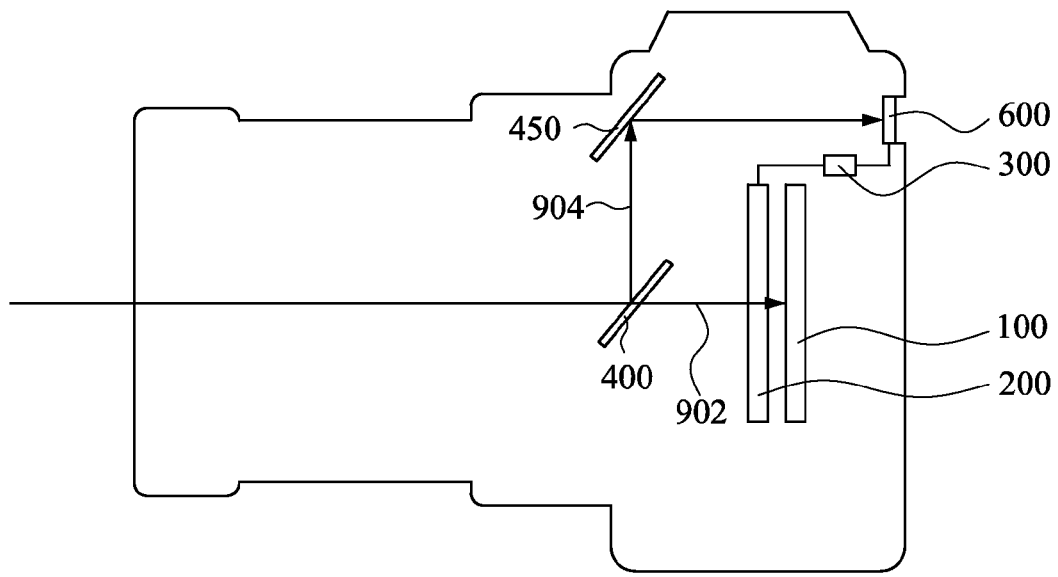
FIG. 7 is a side view of the photographic apparatus according to various embodiments of the present disclosure.
FIG. 8 is a flowchart of a method of manufacturing a photographic apparatus according to various embodiments.

Reference is made to FIG. 7 which is a side view of a photographic apparatus according to various embodiments of the present disclosure. The difference between the photographic apparatus of FIG. 7 and FIG. 6 relates to the addition of a viewfinder 600 and the electrical connection of the image processor 300 in the photographic apparatus of FIG. 7. In some embodiments, the photographic apparatus further includes the viewfinder 600 rather than the image sensor 500. An observer observes the object sensed by the photoelectric conversion element 100 through the viewfinder 600. The viewfinder 600 is configured for sensing the portion 904 of the light, and the image processor 300 is further electrically connected to the viewfinder 600 for adjusting the transmittance of the electrochromic element 200 according to an output of the view finder 600.

In greater detail, the electrons are emitted from the viewfinder 600 when the viewfinder 600 absorbs energy from the portion 904 of the light. In other words, the output of the viewfinder 600 depends on the amount of the portion 904 of the light incident thereon. Through the image processor 300, the electrochromic element 200 turns opaque if the output of the viewfinder 600 is raised. Hence, the amount of the portion 902 of the light incident on the photoelectric conversion element 100 is reduced. As a result, saturation of the photoelectric conversion element 100 is avoided, thereby reducing or preventing overexposure. In some embodiments, the viewfinder 600 includes an array of a plurality of pixel sensors. However, the claimed scope of the disclosure should not be limited in this respect. In some embodiments, the image processor 300 is a control integral circuit, such that the image processor 300 is programmed to adjust the transmittance of the electrochromic element according to the output of the viewfinder 600. Other relevant structural details of FIG. 7 are all the same as FIG. 6, and, therefore, a description in this regard will not be repeated hereinafter.

It is understood that the embodiments of the photographic apparatus mentioned above are provided as examples and are not intended to be limiting. The photographic apparatus may have different configurations consistent with the spirit of the present disclosure in alternative embodiments depending on design requirements and manufacturing concerns.

FIG. 8 is a flowchart of a method of manufacturing a photographic apparatus according to various embodiments. It is noted that the method may be applied to, but should not be not limited to, the photographic apparatus of FIGS. 1-7. Reference is made to FIGS. 1 and 8. As shown in operation 5910, a manufacturer can dispose the electrochromic element 200 on the main path by which light travels to the photoelectric conversion element 100. As shown in operation 5920, the manufacturer can electrically connect the image processor 300 to the electrochromic element.

In this manner, the amount of light incident on the photoelectric conversion element 100 depends on the transmittance of the electrochromic element 200. It should be noted that the flowchart of FIG. 8 shows exemplary operations, but they are not necessarily performed in the order shown. Operations may be added, replaced, changed in order, and/or eliminated as appropriate, in accordance with the spirit and scope of disclosed embodiments.

In some embodiments, the method further includes the operation of:

electrically connecting the image processor 300 to the photoelectric conversion element 100.

In this manner, the image processor 300 adjusts the transmittance of the electrochromic element 200 according to the output of the photoelectric conversion element 100. Since the electrons are emitted from the photoelectric conversion element 100 when the photoelectric conversion element 100 absorbs energy from light, the electrochromic element 200 turns opaque if the output of the photoelectric conversion element 100 is raised. Hence, the amount of light incident on the photoelectric conversion element 100 is reduced. As a result, saturation of the photoelectric conversion element 100 is avoided, thereby reducing or preventing overexposure.

Reference is made to FIG. 6. In some embodiments, the method further includes the operations of:

disposing the beam splitter 400 on the initial path by which the light travels to the electrochromic element 200;

disposing the image sensor 500 at a position to which the portion 904 of the light reflected by the beam splitter 400 travels; and electrically connecting the image sensor 500 to the image processor 300.

In this manner, the image processor 300 adjusts the transmittance of the electrochromic element 200 according to the output of the image sensor 500.

Reference is made to FIG. 7. In some embodiments, the method further includes the operations of:

disposing the beam splitter 400 on the initial path by which the light travels to the electrochromic element 200;

disposing the viewfinder 600 at a position to which a portion 904 of the light reflected by the beam splitter 400 travels; and electrically connecting the viewfinder 600 to the image processor 300.

In this manner, the image processor 300 adjusts the transmittance of the electrochromic element 200 according to the output of the viewfinder 600.

Reference is made to FIG. 2. In some embodiments, the method further includes the operation of:

dividing the electrochromic element 200 into at least two individually controllable segments (e.g., the individually controllable segments 210, 220, 230, and 240).

Electrically connecting the image processor 300 to the electrochromic element 200 includes the operation of:

electrically connecting the image processor 300 to the individually controllable segments.

Since the transmittances of the individually controllable segments of the electrochromic element 200 are adjusted individually, the formation of overexposed areas and underexposed areas of an image is prevented, and more image details are shown. It is noted that although there are four individually controllable segments in FIG. 2, the claimed scope should not be limited in this respect. A person having ordinary skill in the art may design the number of the individually controllable segments according to actual requirements.

According to the embodiments mentioned above, one form of the present disclosure provides the photographic apparatus including the photoelectric conversion element, the electrochromic element, and the image processor. The electrochromic element is disposed on the main path by which light travels to the photoelectric conversion element. The image processor is electrically connected to the electrochromic element for adjusting a transmittance of the electrochromic element.

Another form of the present disclosure provides the photographic apparatus including the photoelectric conversion element, the electrochromic element, and the image processor. The image processor is programmed to adjust the transmittance of the electrochromic element to affect the amount of light incident on the photoelectric conversion element.

Yet another form of the present disclosure provides the method of manufacturing the photographic apparatus including the following operations of:

disposing the electrochromic element on the main path by which light travels to the photoelectric conversion element; and electrically connecting the image processor to the electrochromic element.

Although the embodiments have been described in detail, it should be understood that various changes, substitutions and alterations may be made herein without departing from the spirit and scope of the embodiments as defined by the appended claims. Moreover, the scope of the present application is not intended to be limited to the particular embodiments of the process, machine, manufacture, and composition of matter, means, methods, and steps described in the specification. A person having ordinary skill in the art may readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes separate embodiments, and the combination of various claims and embodiments are within the scope of the disclosure.

What is claimed is:

1. A photographic apparatus comprising:
a photoelectric conversion element;
an electrochromic element disposed on a main path by which light travels to the photoelectric conversion element, wherein the electrochromic element comprises:
  a first electrode;
  a second electrode; and
  at least one electrowetting material, wherein a position of the electrowetting materials changes depending on an electric potential between the first electrode and the second electrode; and
an image processor electrically connected to the electrochromic element for adjusting a transmittance of the electrochromic element.

2. The photographic apparatus of claim 1, wherein the image processor is further electrically connected to the photoelectric conversion element for adjusting the transmittance of the electrochromic element according to an output of the photoelectric conversion element.

3. The photographic apparatus of claim 1, further comprising:
a beam splitter disposed on an initial path by which the light travels to the electrochromic element for splitting the light into at least two portions, one of which travels to the electrochromic element; and
an image sensor for sensing another portion of the light, wherein the image processor is further electrically connected to the image sensor for adjusting the transmittance of the electrochromic element according to an output of the image sensor.

4. The photographic apparatus of claim 1, further comprising:
a beam splitter disposed on an initial path by which the light travels to the electrochromic element for splitting the light into at least two portions, one of which travels to the electrochromic element; and
a viewfinder for sensing another portion of the light, wherein the image processor is further electrically connected to the viewfinder for adjusting the transmittance of the electrochromic element according to an output of the viewfinder.

5. The photographic apparatus of claim 1, wherein the electrochromic element comprises at least two individually controllable segments, and the image processor is electrically connected to the individually controllable segments for individually adjusting transmittances of the individually controllable segments.

6. The photographic apparatus of claim 1, wherein the photoelectric conversion element is a charge-coupled device (CCD).

7. The photographic apparatus of claim 1, wherein the photoelectric conversion element is a complementary metal-oxide-semiconductor (CMOS) image sensor.

8. A photographic apparatus comprising:
a photoelectric conversion element;
an electrochromic element, wherein the electrochromic element comprises at least two individually controllable segments, at least one of the individually controllable segments comprises an electrochromic layer, an ion storage layer, and an ion conductor layer arranged along a first direction, and the individually controllable segments are disposed side by side in a second direction crossing with the first direction; and
an image processor programmed to adjust a transmittance of the electrochromic element to affect an amount of light incident on the photoelectric conversion element, wherein the image processor is programmed to individually adjust transmittances of the individually controllable segments.

9. The photographic apparatus of claim 8, wherein the image processor is programmed to adjust the transmittance of the electrochromic element according to an output of the photoelectric conversion element.

10. The photographic apparatus of claim 8, further comprising:
a beam splitter for splitting the light into at least two portions, one of which travels to the electrochromic element; and
an image sensor for sensing another portion of the light, wherein the image processor is programmed to adjust the transmittance of the electrochromic element according to an output of the image sensor.

11. The photographic apparatus of claim 8, further comprising:
a beam splitter for splitting the light into at least two portions, one of which travels to the electrochromic element; and
a viewfinder for sensing another portion of the light, wherein the image processor is programmed to adjust the transmittance of the electrochromic element according to an output of the viewfinder.

12. A method of manufacturing a photographic apparatus comprising:
disposing an electrochromic element on a main path by which light travels to a photoelectric conversion element;
electrically connecting an image processor to the electrochromic element; and
adjusting a transmittance of the electrochromic element, such that the transmittance of the electrochromic element is reduced when the photoelectric conversion element is in a saturation state, and the transmittance of the element is substantially maintained when the photoelectric conversion element is in a non-saturation state.

13. The method of claim 12, further comprising:
electrically connecting the image processor to the photoelectric conversion element.

14. The method of claim 12, further comprising:
disposing a beam splitter on an initial path by which the light travels to the electrochromic element;
disposing the image sensor at a position to which a portion of the light reflected by the beam splitter travels; and
electrically connecting the image sensor to the image processor.

15. The method of claim 12, further comprising:
disposing a beam splitter on an initial path by which the light travels to the electrochromic element;
disposing a viewfinder at a position to which a portion of the light reflected by the beam splitter travels; and
electrically connecting the viewfinder to the image processor.

16. The method of claim 12, further comprising:
dividing the electrochromic element into at least two individually controllable segments;
wherein electrically connecting the image processor to the electrochromic element comprises:
electrically connecting the image processor to the individually controllable segments.

17. The photographic apparatus of claim 1, wherein the electrowetting material of the electrochromic element is oil.

18. The photographic apparatus of claim 8, wherein the electrochromic element further comprises a first electrode and at least one second electrode, and the electrochromic layer, the ion storage layer, and the ion conductor layer are disposed between the first electrode and the at least one second electrode.

19. The photographic apparatus of claim 8, wherein the photoelectric conversion element is a charge-coupled device (CCD).

20. The photographic apparatus of claim 18, wherein a plurality of the second electrodes are respectively connected to the controllable segments.

\* \* \* \* \*